United States Patent Office 3,842,063
Patented Oct. 15, 1974

3,842,063
POLYPEPTIDES FROM BOVINE, OVINE, HUMAN AND PORCINE PANCREAS
Ronald E. Chance, Westfield, and William E. Jones, Indianapolis, Ind., assignors to Eli Lilly and Company, Indianapolis, Ind.
No Drawing. Continuation-in-part of abandoned application Ser. No. 149,852, June 3, 1971. This application Apr. 25, 1973, Ser. No. 354,281
Int. Cl. A61k 27/00; C07c 103/52
U.S. Cl. 260—112.5                                    5 Claims

ABSTRACT OF THE DISCLOSURE

A protein fraction, isolated from pancreas or various product fractions, by chromatography. The new protein lies between insulin and glucagon in molecular weight. It is useful as an injectable laxative.

CROSS REFERENCE

This application is a continuation-in-part of copending application Ser. No. 149,852, filed June 3, 1971, now abandoned.

BACKGROUND OF THE INVENTION

Field of the Invention

Many important protein fractions have been isolated from the pancreas of animals, of which the most important is insulin. Whether regarded as proteins, or polypeptides of molecular weight lower than that of proteins, or, from another point of view, whether regarded as hormones, many of these pancreas fractions are of value in medicine.

The protein here disclosed has apparently been present in various fractions that have been isolated and studied; but because it has been intimately associated in small amounts with other substances, its own action upon animal systems has been obscured, and, until now, has not been available.

DESCRIPTION OF THE PRIOR ART

The discoverers of this protein have made no elaborate search of the art, and are not aware of any that they deem to be particularly relevant to this discovery. An interesting pancreatic fraction is discussed by Zollinger et al., Ann. Surg. 168, 502 (1968). Kimmel et al., and Hazelwood et al. discuss avian pancreatic fractions at Endocrinology 83, 1323 and 1331, respectively (1968).

DESCRIPTION OF THE PREFERRED EMBODIMENT

The following is descriptive of the best mode of practicing this invention together with minor variations thereof that are at times desirable.

The present protein, routinely extracted from bovine pancreas, is (using the standard nomenclature abbreviations for polypeptides: see *J. Biol. Chem.* 247, 977–983 (1972)) represented by the formula Ala-Pro-Leu-Glu-Pro-Gln-Tyr-Pro-Gly-Asp-Asp-Ala-Thr-Pro-Glu-
1                    6                           12  13
Gln-Met-Ala-Gln-Tyr-Ala-Ala-Glu-Leu-Arg-Arg-Tyr-Ile-Asn-Met-Leu-
   18                          24  25                       30
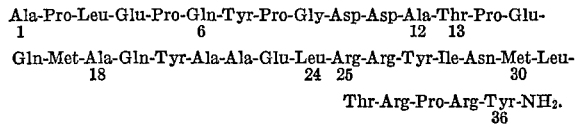
Thr-Arg-Pro-Arg-Tyr-NH₂.
36

As is expected in the art of natural polypeptides, all the amino acid moieties are of the laevorotatory optical isomeric form.

The counterpart polypeptide from porcine pancreas is identical with that set forth above, except that at the 6-position, wherein the bovine polypeptide presents a glutamine, the porcine presents a valine. Similarly, the ovine differs from the bovine in presenting a serine at position 2 where the bovine presents proline, and the human differs from the bovine in presenting aspartic acid at position 23, where the bovine presents a glutamic acid. The human polypeptide possibly differs from the bovine at position 15, wherein the human may present glutamine or glutamic acid, whereas the bovine present glutamic acid. In addition, in the human polypeptide, there is replacement of a glutamine (of the bovine) by valine, at position 6, as in the porcine material. Further, the human polypeptide differs from the bovine by presenting an amide form of the given bovine residue at either position 10, 11, or 15 (Y', Y" and Z respectively in the following formula) such as asparagine at either 10 or 11, with aspartic acid at 11 or 10, respectively, in either case with glutamic acid at position 15; or, a glutamine at position 15, and aspartic acids at both positions 10 and 11. Such minor species differences are well known in the gland extract art; the substances present similar chemical and pharmacological behaviors, and in use, one can be substituted for the other, or a mixed material can be used.

Thus, in one form of expression, the present protein is of the composition

Ala-X-Leu-Glu-Pro-Y-Tyr-Pro-Gly-Y'-Y"-Ala-Thr-Pro-Z-Gln-Met-
1                    6                           12  13
Ala-Gln-Tyr-Ala-Ala-Z'-Leu-Arg-Arg-Tyr-Ile-Asn-Met-Leu-Thr-Arg-
18                          24  25                       30
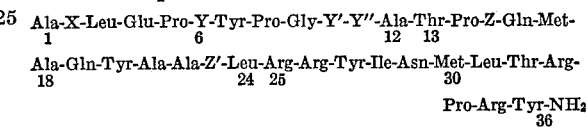
Pro-Arg-Tyr-NH₂
36 wherein in the particular embodiments, X, Y, Y', Y", Z, and Z' have these values

|          | X   | Y   | Y'  | Y"  | Z   | Z'  |
|----------|-----|-----|-----|-----|-----|-----|
| Bovine   | Pro | Gln | Asp | Asp | Glu | Glu |
| Porcine  | Pro | Val | Asp | Asp | Glu | Glu |
| Ovine    | Ser | Gln | Asp | Asp | Glu | Glu |
| Human    | Pro | Val | Asx | Asx | Glx | Asp | wherein
  Asx represents Asp or Asn; and
  Glx represents Glu or Gln, with the proviso that one and only one of Asx and Glx can be Asn or Gln at any one time.

The product of this discovery is present in low concentrations in commercial crystalline insulin: it is present in higher concentrations in the crude pancreatic extract produced in the separation of insulin, and known in the art as "salt cake." The product is present in, and has been extracted from, the mother liquor of the alkaline insulin crystallization process. Also, it can be extracted from pancreas itself, and from crude liquid extracts of pancreas.

In preparing the product of this invention, one can start preferably with fresh whole pancreas. The gland is rinsed and immediately refrigerated. If it is to be kept for more than a minimal period of time, it is held in frozen condition. The amount of gland employed is not critical, but for a convenient yield of 30–50 milligrams of product, about ten kilograms of whole pancreas are required. All subsequent operations described hereinafter are carried out with care in a chill room at a temperature of about 4° C. Solvents and similar materials are introduced at the indicated temperature.

The gland is finely ground, to a near-emulsified condition, and the ground bland is contacted with aqueous ethyl alcohol acidified to pH of about 2.8 with a suitable acid. Suitable acids include phosphoric, hydrochloric, and sulfuric acid, and the like. The resulting slurry is stirred, and insoluble tissue substances thereafter removed by filtration. The desired product is in the filtrate. Similarly, while ethanol is the solvent of choice, other water-miscible organic solvents can be used, including acetone, other water soluble ketones, acetaldehyde, other water soluble aldehydes, and the like.

The acidic filtrate from above is adjusted to a pH of 8 to 8.5, by the judicious addition of aqueous alkali metal hydroxide or, preferably, aqueous ammonia. At this pH, some fats and ammonium phosphate precipitate from the resulting preparation. The solution is removed, as by decantation, filtration, or both.

The resulting solution, which contains the polypeptide, is then adjusted to a pH of about 5.2 with, for example, acetic acid. This solution is then diluted with a mixture of four volumes of diethyl ether and two volumes of ethanol. The mixture is allowed to stand overnight or an equivalent or longer period of time, and in this time, almost all proteins, including the present product, precipitate. The resulting partial suspension is centrifuged and the pricipitate recovered. The precipitate is dried in vacuo, washed with ether to remove residual fats, if any, and then freed of residual ether under vacuum. The dried product is dissolved in molar acetic acid and the solution is chromatographed over a column of fine modified dextran (Sephadex G-50), to separate the new protein from other acid-alcohol-soluble pancreatic proteins, the most notable of which are insulin and glucagon. The separation is made possible by the difference in molecular mass of these three compounds.

Glucagon has a molecular mass of approximately 3500. The new protein has a molecular mass of approximately 4200, in one determination of the bovine form—while insulin has a molecular mass of approximately 5800.

Because glucagon contains a tryptophane moiety, which confers upon the molecule the capability to sorb, somewhat, on Sephadex, the Sephadex separation of glucagon and the new protein is moderately better than would be expected, considering the molecular mass alone. Hence, the presene Sephadex separation is preferred to other kinds of separation techniques.

By the above-described process, the present protein and a few others are separated from unwanted by-products. The eluate can be monitored by ultraviolet absorption, the desired protein eluate peak being identified by a strong absorption at 276 millimicrons. When the subsidence of one such absorbance maximum is noted, the collection means is changed, and, optionally, is changed subsequently upon noting the onset of another absorbance maximum. In another procedure, collection means are changed according to time, and/or when visual observation or a time-based elution profile (at 276 millimicrons) indicate which separately-collected samples are of interest. The fraction containing the present protein still contains small amounts of insulin and glucagon, which are subsequently essentially all removed.

This fraction is then lyophilized to obtain a dry substance. This dry substance is then dissolved in a buffer of 0.01 molar tris(hydroxymethyl)aminomethane, 0.001 molar tetrasodium ethylenediaminetetraacetate, and 7 molar urea, and the pH (originally about 11) of the resulting solution is adjusted to about pH 9.0 with aqueous hydrochloric acid.

When the dry substance has been entirely dissolved in a minimum sufficient quantity of the buffer, the resulting solution is chromatographed through a column of diethylaminoethyl cellulose, using further portions of the same buffer solution as eluent.

In this elution, traces of undesired materials are eluted first, followed by glucagon. After glucagon, the protein of this invention is eluted. In the preferred embodiment here described, insulin remains bound in the chromatographic column. If desired, the insulin can be eluted from the column by the use of stronger salt solutions, after the present new protein has been recovered.

The eluate, in buffer solution, is then chromatographed on a column of coarse modified dextran (Sephadex G-25), with 2 percent aqueous acetic acid as eluent. This step removes nonaqueous buffer components almost completely. The resulting solution is again lyophilized and the dried product remaining upon completion of lyophilization is the protein of this invention.

The product thus obtained is characterized in the following manner. A preferred first characterization step is analysis for the $NH_2$-terminal amino acid. A portion of product is allowed to react in known manner with 1-dimethylaminonaphthalene-5-sulfonyl chloride to form the adduct with alanine, which is the terminal amino acid. The additional steps of this characterization are well known to those skilled in the art.

When the results of this test for alanine are satisfactory, the product is examined by polyacrylamide disc-gel electrophoresis in a tris-borate buffer from 0.1 percent product concentration. After two hours at a constant electrophoretic current of 2 milliamperes, the gel is stained with Coomassie Brilliant Blue at about 0.025 percent concentration in 10 percent aqueous trichloroacetic acid. This test should result in a single blue zone of significant density, representing the present single protein.

If this test yields satisfactory results, the sample may, if desired, be subjected to amino acid sequence analysis, partial or entire.

The dry, isolated product is a white, crystalline material which decomposes with heat before manifesting a clear melting temperature. Aanlysis by a sequence of substractive Edman steps leads to the structure hereinbefore assigned.

The product has various bioligical effects. It enhances gut mobility, constricts the choledocus, and relaxes the gall bladder.

It is useful as a veterinary laxative that does not require oral ingestion. In such use, it is administered in any known fashion by which the undenatured polypeptide enters the bloodstream. Administration of the material brings on involuntary defecation of colon contents. When prompt effects are desired, it will be administered intravenously. When an effect of more prolonged nature, slower in onset, is desired, it will be administered as a depot from which it is slowly mobilized by the bloodstream, such as, subcutaneously in a region of good peripheral circulatory supply.

Dosage rates are adjusted according to the species of animal, magnitude of desired response, and other factors routinely taken into consideration in establishing dose rates. As a general guide, the properties of the product of this invention have been well exhibited in dogs upon venous injections of from 5 to 50 micrograms per kilogram body weight. Doses as low as 0.5 micrograms per kilogram are also efficacious.

We claim:

1. A polypeptide of the formula

Ala-X-Leu-Glu-Pro-Y-Tyr-Pro-Gly-Y'-Y''-Ala-Thr-Pro-Z-Gln-Met-
 1          6                          12  13
Ala-Gln-Tyr-Ala-Ala-Z'-Leu-Arg-Arg-Tyr-Ile-Asn-Met-Leu-Thr-Arg-
 18              24  25                         30

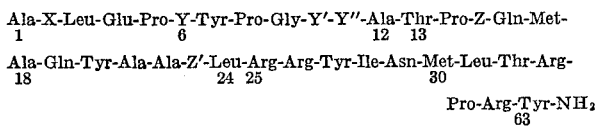

which mets at least one of the definitions that

X=Pro, Y=Gln, Y'=Asp, Y''=Asp, Z=Glu, Z'=Glu, or

X=Pro, Y=Val, Y'=Asp, Y''=Asp, Z=Glu, Z'=Glu, or

X=Ser, Y=Gln, Y'=Asp, Y''=Asp, Z=Glu, Z'=Glu, or

X=Pro, Y=Val, Y'=Asx, Y''=Asx, Z=Glx, Z'=Aps, wherein

Asx represents Asp or Asn; and
Glx represents Glu or Gln, with the proviso that one and only one Asx and Glx can be Asn or Gln at any one time,

2. The polypeptide of Claim 1 which is the formula

Ala-Pro-Leu-Glu-Pro-Gln-Tyr-Pro-Gly-Asp-Ala-Thr-Pro-Glu-Gln-
1                        6                        12 13
Met-Ala-Gln-Tyr-Ala-Ala-Glu-Leu-Arg-Arg-Tyr-Ile-Asn-Met-Leu-Thr-
18                      24 25                    30
                                    Arg-Pro-Arg-Tyr-NH₂.
                                    36

3. The polypeptide of Claim 1 which is the formula

Ala-Pro-Leu-Glu-Pro-Val-Tyr-Pro-Gly-Asp-Asp-Ala-Thr-Pro-Glu-
1                        6                        12 13
Gln-Met-Ala-Gln-Tyr-Ala-Ala-Glu-Leu-Arg-Arg-Tyr-Ile-Asn-Met-
18                          24 25                    30
                                    Leu-Thr-Arg-Pro-Arg-Tyr-NH₂.
                                    36

4. The polypeptide of Claim 1 which is of the formula

Ala-Ser-Leu-Glu-Pro-Gln-Tyr-Pro-Gly-Asp-Asp-Ala-Thr-Pro-Glu-
1                        6                        12 13
Gln-Met-Ala-Gln-Tyr-Ala-Ala-Glu-Leu-Arg-Arg-Tyr-Ile-Asn-Met-
18                          24 25                    30
                                    Leu-Thr-Arg-Pro-Arg-Tyr-NH₂.
                                    36

5. A polypeptide of Claim 1 which is of the formula

Ala-Pro-Leu-Glu-Pro-Val-Tyr-Pro-Gly-Asx-Asx-Ala-Thr-Pro-Glx-Gln-
1                        6                        12 13
Met-Ala-Gln-Tyr-Ala-Ala-Asp-Leu-Arg-Arg-Tyr-Ile-Asn-Met-Leu-
18                      24 25                    30
                                    Thr-Arg-Pro-Arg-Tyr-NH₂.
                                    36

References Cited

Mirsky et al.: J. Clin. Invest., *42,* 1869–72 (1963).
Humbel et al.: Biochem., *4,* 1044–8 (1965).
Nagasawa et al.: Eisei Shikenjo Hokoku (Tokyo), *75,* 95–98 (1957).
Carpenter et al.: Biochem., *2,* 1272–7 (1963).

LEWIS GOTTS, Primary Examiner

R. J. SUYAT, Assistant Examiner

U.S. Cl. X.R.

424—177

PO-1050
(5/69)

UNITED STATES PATENT OFFICE
CERTIFICATE OF CORRECTION

Patent No. 3,842,063                Dated October 15, 1974

Inventor(s) Ronald E. Chance and William E. Jones

It is certified that error appears in the above-identified patent and that said Letters Patent are hereby corrected as shown below:

Column 2, line 66, "bland" should read --gland--.

Column 4, lines 27-28, "substractive" should read --subtractive--.

Column 4, line 58, the number "63" under the term "Tyr" should read --36--.

Column 4, line 60, "mets" should read --meets--.

Column 4, line 67, the last term "Aps" should read --Asp--.

Column 5, line 2, should read as follows:
--Ala-Pro-Leu-Glu Pro-Gln-Tyr-Pro-Gly-Asp-Asp-Ala-Thr-Pro-Glu-Gln--
                       6                          12        13

Signed and sealed this 7th day of January 1975.

(SEAL)
Attest:

McCOY M. GIBSON JR.                C. MARSHALL DANN
Attesting Officer                  Commissioner of Patents